April 12, 1949.  C. H. HOEPPNER  2,466,705
DETECTOR SYSTEM
Filed Oct. 30, 1946
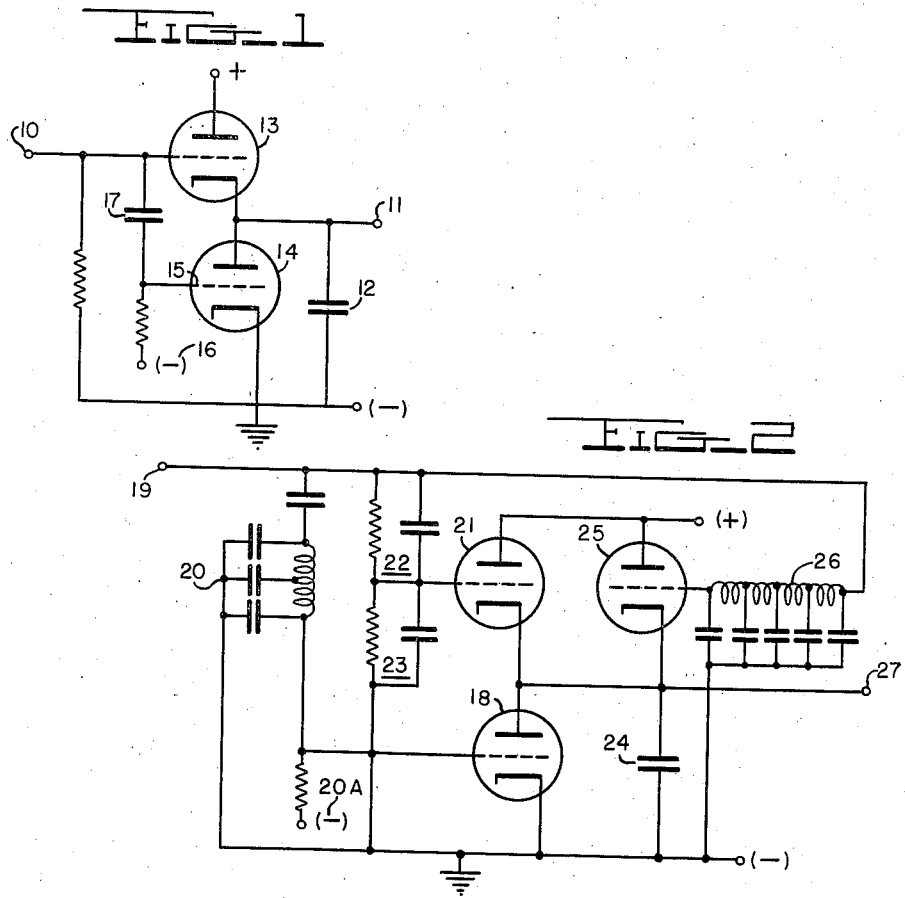
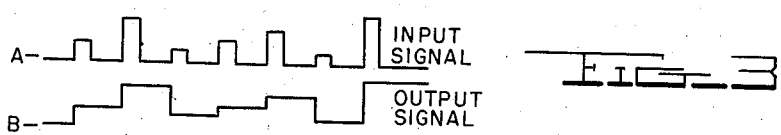
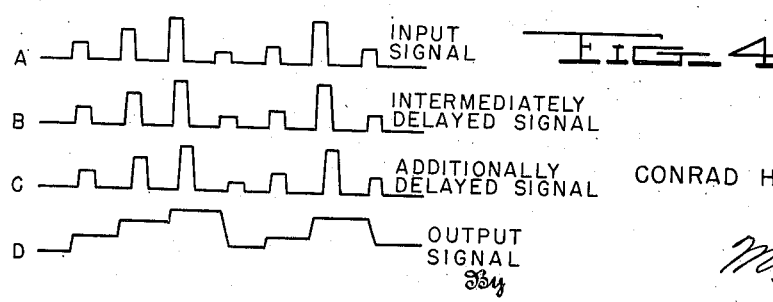
CONRAD H. HOEPPNER
Inventor
By M. Q. Hayes
Attorney Patented Apr. 12, 1949

2,466,705

UNITED STATES PATENT OFFICE 2,466,705

DETECTOR SYSTEM

Conrad H. Hoeppner, Washington, D. C.

Application October 30, 1946, Serial No. 706,789

4 Claims. (Cl. 250—27)

(Granted under the act of March 3, 1883, as amended April 30, 1928; 370 O. G. 757)

This invention relates to detector systems and in particular to improved peak riding detectors for reproducing accurately peak amplitude variations of a recurrent pulse type signal.

In numerous applications of radio receiving and integrating equipment it is desirable to have a detector device capable of accurately producing a signal in dependency on the amplitude variations of a recurrent signal. In typical apparatus of this class provided by the prior art as typified by a diode unilateral impedance device operating in conjunction with a resistance-capacitance time constant filter circuit, the time constant of the filter circuit must be sufficiently short to permit conduction by the diode at least on the crest of succedent pulses which may be subject to considerable amplitude variation. This operation, of necessity, requires considerable decay in voltage across the filter circuit in the interval between succedent pulses. Frequently such variation between pulses is undesirable.

It is therefore an object of the present invention to provide improved signal detector apparatus.

Another object of the present invention is to provide signal detector apparatus responsive to rapid variations in amplitude of succedent pulses and capable of maintaining a substantially constant level output signal in the time interval between succedent pulses.

Another object of the present invention is to provide detector apparatus responsive to an amplitude modulated high frequency signal to produce an output signal proportional in instantaneous amplitude to peak amplitude of the modulation of the high frequency signal with minimum variation in the output signal between successive peaks of the carrier signal.

Other and further objects and features of the present invention will become apparent upon a careful consideration of the accompanying description and drawings.

Figure 1 is a schematic diagram of a basic embodiment of the present invention.

Figure 2 is a more elaborate form of the basic embodiment designed for greater flexibility of operation.

Figures 3 and 4 show, respectively, waveforms taken to illustrate more fully the operation of the circuits of Figures 1 and 2.

In accordance with the fundamental concepts of the present invention a signal integrator or detector is provided in which a capacitive type energy storage device is charged and discharged to voltage levels proportional to the amplitudes of succedent input signals. The capacitive device is charged to a voltage level proportional to that of a first input signal by a cathode follower type electrical circuit possessing low output impedance. Connected in shunt with the capacitive storage device is the anode circuit of a biased electron tube. In the time interval between input signals this shunt electron tube is maintained in a substantially non-conductive condition. Input signals, however, do raise the shunt connected tube to a condition of anode circuit conductivity to permit current flow therethrough. This flow of current tends to discharge the capacitive storage device and unless supplied through the cathode follower type circuit the voltage across the capacitive storage device will fall quite rapidly until the potential thereacross is proportional to the input signal permitting conduction by the cathode follower tube.

With particular reference to Fig. 1 a detector circuit is provided which is designed to receive at input terminal 10 a multiple pulse type signal such as that shown in waveform A of Fig. 3 in which the pulses are of varying amplitudes. The peak sustained signal waveform B of Fig. 3 is obtained from output terminal 11 across capacitive type energy storage device 12. In operation capacitive type storage device 12 is charged to a peak amplitude substantially that of the peak of the input pulses by the low output impedance cathode follower tube 13. Capacitance 12, thus charged, will remain without appreciable loss of voltage thereacross even after the conclusion of the positive pulse provided the shunt electron tube 14 is non-conductive. To permit the circuits to respond to a second pulse having a lesser amplitude than a first pulse, a capacitance discharge path operative from the input pulses is provided. This discharge path consists of the anode circuit of electron tube 14 which is placed in shunt with capacitance 12. Electron tube 14 is maintained in a normally non-conductive condition by virtue of a negative bias supplied to the grid 15 thereof from source 16. Upon application of the positive input pulses of waveform A to the grid of tube 13 similar pulses are applied by means of capacitance 17 to the grid 15 of tube 14. Tube 14 is thereby rendered conductive to provide a discharge path for capacitance 12. Thus, tube 14 is rendered conductive by the low amplitude second pulse to produce a partial discharge of capacitance 12 reducing the potential at the cathode of tube 13 until it is substantially proportional to that of the signal applied to the grid of tube 13. When the voltage at the cathode of tube 13 is reduced to this point further voltage reduction is prevented by cathode follower (low output impedance) action of tube 13.

In a similar manner the existence of another pulse signal at terminal 10 of amplitude greater than that immediately preceding will produce anode circuit conductivity by tube 14 which will be more than counter-balanced by the cathode follower action of tube 13 so that capacitance 12 will receive additional charge.

The simple circuit of Fig. 1 is ideally suited for pulse type operation, however, when the input pulses have sloping leading and trailing edges operation may sometimes be enhanced by the more elaborate circuit of Fig. 2. For pulses having sloping leading trailing edges such as those shown in waveform A of Figure 4, it is likely that the capacitance discharge tube may conduct appreciably in the interval of time immediately preceding and immediately following the attainment of crest pulse amplitude because of the bias conditions.

Where such action occurs it is apparent that slight discontinuities will be present in the output signal immediately preceding and immediately following each input pulse whether that pulse is equal to the preceding pulse or not. The discontinuity immediately preceding the conductivity period of the cathode follower tube is not of serious consequence because it will generally be of short duration lasting only until the cathode follower tube is brought to conduction on the crest of the input pulse signal. On the other hand, conduction by the discharge tube following the cessation of conduction by the cathode follower tube will produce a drop in the voltage across the capacitive storage device which can not be overcome.

Included in the expanded circuit of Fig. 2 is an additional cathode follower type tube and delay apparatus not present in Fig. 1. With this circuit the capacitance discharge tube 18 which is biased from source 20A, receives input pulse signals from terminal 19 through a delay line while a first cathode follower charging tube 21 receives undelayed pulse signals via the capacity compensated voltage divider 22 and 23. The delay time of circuit 20 is chosen so that cathode follower charging tube 21 will be brought to conduction by the crest of the input pulses for a short period of time before the discharge tube 18 is rendered conductive. By this means discharge tube 18 cannot produce a reduction in voltage across the capacitive storage device 24 on the sloping leading edge of the input signals.

A second cathode follower charging tube 25 is provided with the input pulse signal via a second delay line 26. Delay line 26 is adjusted so that the crest of the input pulse signals will be applied to tube 25 during the sloping trailing edge of each of the input pulses similarly preventing discharge of capacitance 24 during this second interval of time. The smooth integrated output as indicated by waveform D of Fig. 4 is produced at output terminal 27.

From the foregoing discussion it is apparent that considerable modification of the features of the present invention is possible and while the devices herein described and the forms of apparatus for the operation thereof constitute preferred embodiments of the present invention it is to be understood that the invention is not limited to these precise devices and forms of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. An integrator device responsive to peak amplitudes of input pulse type signals having sloping leading and trailing edges, comprising; first and second electron tubes, a common load circuit for the first and second tubes comprising a capacitive energy storage device receptive of low impedance charging from the first and second tubes responsive to signals applied thereto, a third electron tube placed in shunt with the capacitive storage device responsive to applied signals to effect an impedance discharge path therefor operative to produce partial discharge thereof upon receipt of low amplitude input signals following high amplitude input signals, first delay means delaying input pulse type signals applied to the third electron tube by an intermediate amount of time to prevent conduction thereby during the sloping leading edges of the signals, and second delay means delaying application of input pulse type signals to the second electron tube by an additional amount rendering the second electron tube conductive during sloping trailing edges of pulse signals applied to the third electron tube.

2. A demodulator for pulse signals comprising, a storage capacitor, first space discharge means serially connected to said capacitor and operative in response to an input pulse signal applied thereto to store a charge on said capacitor proportional to the peak amplitude of the input signal, second space discharge means connected in shunt with said capacitor and serving to provide a normally high resistance discharge path therefor, and means operative to lower the resistance of said last named discharge means in response to and for the duration of said input pulse signal.

3. A demodulator for pulse signals comprising, first space discharge means comprising anode, grid and cathode electrodes, a storage capacitor connected in the cathode circuit of said discharge means whereby said discharge means is operative in response to an input pulse signal applied to the grid circuit thereof to store a charge on said capacitor proportional to the peak amplitude of the input signal, second space discharge means connected in shunt with said capacitor and serving to provide a normally high resistance discharge path therefor, and means operative to lower the resistance of said last named discharge means in response to and for the duration of said input pulse signal.

4. In a pulse signal demodulator system for producing an output voltage level proportional to the peak amplitudes of input pulse type signals of varying amplitudes, a first electron discharge device having a low output impedance, a capacitive energy storage device connected to the output of said first electron discharge device whereby said device is responsive to the amplitude of the input pulse signal applied thereto to produce a low impedance charging of said capacitive energy storage device at a level proportional to the amplitude of the said input pulse signal, a second electron discharge device having a cathode, a control electrode and an anode, said second electron discharge device connected in shunt circuit arrangement with said capacitive energy storage device and operative to provide a discharge path therefor, means for holding said second electron discharge device normally non-conductive whereby said second device provides a normally high resistance discharge path for said capacitor, means for impressing the input pulse signals on said control electrode of said second electron discharge device thereby to render the same conductive for the duration of said input pulses whereby said capacitive energy storage device receives a charge proportional to the input pulse signal amplitude.

CONRAD H. HOEPPNER.

REFERENCES CITED

The following references are of record in the file of this patent:

UNITED STATES PATENTS

| Number | Name | Date |
|---|---|---|
| 2,211,942 | White | Aug. 20, 1940 |
| 2,230,212 | Crosby | Jan. 28, 1941 |
| 2,266,154 | Blumlein | Dec. 16, 1941 |
| 2,299,252 | Pierce | Oct. 20, 1942 |